United States Patent Office 3,391,142
Patented July 2, 1968

3,391,142
ADAMANTYL SECONDARY AMINES
Jack Mills and Eriks Krumkalns, Indianapolis, Ind., assignors to Eli Lilly and Company, Indianapolis, Ind., a corporation of Indiana
No Drawing. Filed Feb. 9, 1966, Ser. No. 526,060
5 Claims. (Cl. 260—268)

The present invention is concerned with novel adamantylamine compounds and the preparation thereof.

The novel compounds provided by this invention are active antiviral agents.

It is an object of this invention to provide a process for the preparation of adamantylamine compounds valuable in pharmacological properties and useful as intermediates in the synthesis of other pharmacological products. A further object is to provide novel compounds possessing valuable pharmacological activities. Another object is the preparation of the adamantylamines by a simple, direct method of synthesis. These and other objects will be apparent from the following disclosure and the appended claims.

The above and other objects are accomplished by commingling an adamantyl halide with an amine, as hereinafter defined, and heating the resulting mixture at a temperature in the range of from about 120° C. to about 260° C. for a period of time sufficient to produce a substantial yield of the corresponding N-adamantyl-substituted amine. The length of time of the reaction will vary inversely with the temperature at which the reaction is carried out and will be influenced, to some extent, by the particular reactants employed. In general, it can be stated that a reaction time of about 6 to about 18 hours is adequate to provide optimum yields, the longer times being at the lower temperatures. Higher temperatures are generally less desirable, inasmuch as decomposition to unwanted by-products is more likely to occur.

The reaction product mixture thus obtained contains the desired product, which can be isolated by a variety of methods well known to the art. In one convenient method, the crude reaction product mixture is commingled with water, adjusted to alkaline pH by addition of sodium hydroxide or other strong inorganic base in at least a small excess, and extracted with a water-immiscible organic solvent such as ether, benzene, chloroform, or the like. The product is readily obtained in the form of the free base by distillation of the resulting extract. Alternatively, the product can be precipitated from the extract. Alternatively, the product can be precipitated from the extract in the form of an acid addition salt by saturating the extract with an anhydrous hydrogen halide such as hydrogen chloride, hydrogen bromide, or the like. Other acid addition salts may be prepared using suitable acids, including sulfuric, nitric, phosphoric, tartaric, and maleic acids, and the like.

In one embodiment of the invention, a mixture of 1-bromoadamantane and 1-aminoadamantane is heated at a temperature of about 255° C. and autogenous pressure for about 12 hours in a closed stainless-steel reaction vessel. The reaction vessel is cooled and the solidified reaction product mixture removed therefrom and recrystallized from ethanol to yield bis-(1-adamantyl)-amine in the form of its hydrobromic acid addition salt.

In another embodiment of the invention, a mixture of 1-bromoadamantane and an excess of liquid ammonia, together with ethanol as a solvent, is heated in a closed stainless-steel reaction vessel at a temperature of about 170° C. for about 15 hours. The reaction vessel is cooled and the reaction product mixture removed and concentrated in vacuo to dryness. The solid residue is basified with aqueous sodium hydroxide solution and the solution thereby obtained is extracted with ether. The ether extract is dried over sodium hydroxide pellets, concentrated to about half the original volume, and saturated with anhydrous hydrogen chloride, thereby precipitating the desired product, 1-aminoadamantane, in the form of its hydrochloric acid addition salt.

In yet another embodiment of the invention, a mixture of 1-bromoadamantane and 1,3 diaminopropane is heated to a temperature of about 180–220° C. for a period of about 12 hours, whereby N,N'-bis(1-adamantyl)-1,3- propanediamine bis-hydrobromide is produced. The reaction product mixture is concentrated in vacuo, and the desired product is isolated in the general manner described hereinabove.

The novel process described herein comprises reacting a compound of the formula:

$$\text{Ad—X} \quad \text{(I)}$$

wherein:

Ad is adamantyl, 3-methyladamantyl, 3,5-dimethyladamantyl, or 3,5,7-trimethyladamantyl;
X is bromine or chloride, with a compound of the formula:

wherein:

$R^1$, when taken alone, is hydrogen or $C_1$–$C_{12}$ alkyl;
$R^2$, when taken alone, is hydrogen, $C_1$–$C_{12}$ alkyl, loweralkoxy $C_1$–$C_5$ alkyl,

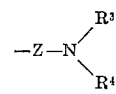

hydroxy $C_1$–$C_5$ alkyl, $C_5$–$C_8$ cycloalkyl, phenyl, furyl, thienyl, phenyl-substituted $C_1$–$C_5$ alkyl, or Ad;
$R^1$ and $R^2$, when taken together with the nitrogen atom to which they are attached, are pyrrolidine, piperidine, pyridine, morpholine, isoquinoline, quinoline, piperazine, or 4-(substituted)-piperazine, the substituents on the piperazine ring being $C_1$–$C_5$ alkyl, hydroxy-substituted $C_1$–$C_5$ alkyl, phenyl, or substituted phenyl, and the substituents on the phenyl being $C_1$–$C_5$ alkyl or halo;
Z is $C_2$–$C_8$ alkylene;
$R^3$ and $R^4$, when taken separately, are hydrogen or lower alkyl, the same or different; and
$R^3$ and $R^4$, when taken together with the nitrogen atom to which they are attached, are pyrrolidine, piperidine or morpholine.

The novel compounds provided by this invention are the free bases represented by the following formula:

as well as the acid addition salts thereof, wherein:

Ad has the same meaning as disclosed hereinabove;
$R^5$, when taken alone, is hydrogen;
$R^6$, when taken alone, is Ad, phenyl, or

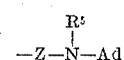

$R^5$ and $R^6$, when taken together with the nitrogen atom to which they are attached, form a heterocyclic ring of the class consisting of piperazine and 4-(substituted) piperazine having at least one substituent of the class consisting of $C_1$–$C_5$ alkyl, hydroxy-substituted $C_1$–$C_5$ alkyl, phenyl, and substituted phenyl, the substituted phenyl having at least one substituent of the class consisting of $C_1$–$C_5$ alkyl and halo;

Z is $C_2$–$C_8$ alkylene.

In connection with the above formula, $C_1$–$C_{12}$ alkyl refers broadly to primary, secondary and tertiary alkyl of both straight-chain and branched-chain configurations, including methyl, ethyl, n-propyl, isopropyl, n-butyl, sec.-butyl, n-amyl, 2-amyl, neopentyl, n-hexyl, n-heptyl, 3-methylpentyl, 2-ethylhexyl, n-decyl, 6-ethyldecyl, n-dodecyl, and the like.

$C_1$–$C_5$ alkyl refers broadly to primary, secondary and tertiary alkyl of both straight-chain and branched-chain configurations, including methyl, ethyl, n-propyl, isopropyl, n-butyl, sec.-butyl, n-amyl, 2-amyl, neopentyl, and the like.

Lower alkyl refers to methyl, ethyl, n-propyl and isopropyl.

Phenyl-substituted $C_1$–$C_5$ alkyl refers to benzyl, phenethyl, 2-phenylpropyl, 5-phenylpentyl, 4-phenylbutyl, 1-phenylethyl, 1-(p-tolyl)ethyl, and the like.

Halo refers to bromo, chloro, iodo, and fluoro.

$C_2$–$C_8$ alkylene refers broadly to divalent aliphatic hydrocarbon radicals of both straight-chain and branched-chain configurations, including ethylene, trimethylene, tetramethylene, pentamethylene, hexamethylene, heptamethylene, octamethylene, 2-methylpropylene-1,3,2-methylbutylene-1,4, 2-ethylpropylene-1,3 and the like.

Lower-alkoxy $C_1$–$C_5$ alkyl refers to the $C_1$–$C_5$ alkyl groups above, having attached thereto at any available position a lower alkyl group through an intervening oxygen, and can be illustratively 2-methoxyethyl, 3-methoxypropyl, ethoxymethyl, 4-ethoxybutyl, 5-methoxypentyl, 3-methoxypentyl, 2-ethoxybutyl, 4-ethoxypentyl, and the like.

Illustrative amines represented by the above Formula III include methylamine, dimethylamine, ethylamine, diethylamine, n-propylamine, n-butylamine, ammonia, di-n-propylamine, di-n-butylamine, di-amylamine, di-n-hexylamine, di-n-propylamine, di-dodecylamine, n-amylamine, adamantylamine, 1-amino-3,5-dimethyladamantane, toluidine, morpholine, piperazine, 4-methylpiperazine, n-hexylamine, dodecylamine, benzylamine, aniline, β-phenylisopropylamine, homoveratrylamine, 1-(4-methyl-3-chlorophenyl)piperazine, N - phenylpiperazine, m - toluidine, p-toluidine, o - chloroaniline, N-(β-hydroxyethyl)piperazine, 1,3-propanediamine, pyridine, 4-picoline, cyclohexylamine, piperidine, morpholine, 3-methoxypropylamine, 3-morpholinopropylamine, and the like.

Adamantane, from which is derived the adamantyl, methyladamantyl, dimethyladamantyl, and trimethyladamantyl radicals referred to above, is a tricyclic multibridged hydrocarbon. Its structure is conventionally represented in two dimensions by the following formula:

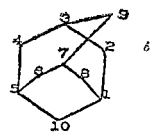

As can be seen from the above formula, adamantane has four identical bridgehead positions which are equivalent and which are the odd-numbered positions 1, 3, 5, and 7 in the above representation. It is at these bridgehead positions that the adamantane moiety is attached to the methyl substituents and to the remainder of the molecule. Thus, in the case of monomethyladamantylamine, the point of attachment of the amino group is by custom designated by the number 1, and the methyl group can be attached at any one of the three remaining equivalent bridgehead positions to give identical end products. By convention, however, the point of attachment is given the number 3. The dimethyladamantylamines are likewise identical, regardless of the point of attachment of the methyl groups, but they are conventionally referred to as 3,5-dimethyl-1-adamantylamine. There is only one trimethyladamantylamine, which can be designated as 3,5,7-trimethyl-1-adamantylamine.

Compounds which can be prepared by the process of this invention can be illustrated as follows:

| Reactant I | Reactant II | Product |
|---|---|---|
| 1-adamantyl bromide | Methylamine | N-(1-adamantyl)-methylamine. |
| 1-adamantyl chloride | Ethylamine | N-(1-adamantyl)-ethylamine. |
| Do | n-Propylamine | N-(1-adamantyl)-n-propylamine. |
| Do | n-Butylamine | N-(1-adamantyl)-n-butylamine. |
| 1-adamantyl bromide | Dimethylamine | N-(1-adamantyl)-dimethylamine. |
| 1-adamantyl chloride | Pyrrolidine | N-(1-adamantyl)-pyrrolidine. |

The process of the invention can also be used to prepare the following adamantylamines by reacting an adamantyl bromide or chloride with the appropriate amine:

N-(1-adamantyl)diethylamine
N-(3-methyl-1-adamantyl)isopropylamine
N-(3,5-dimethyl-1-adamantyl)ethylmethylamine
N-(1-adamantyl)morpholine
N-(3,5,7-trimethyl-1-adamantyl)piperidine
N,N'-bis(1-adamantyl)-1,3-propanediamine
N,N'-bis(3-methyl-1-adamantyl)-1,10-decanediamine
N,N'-bis(3,5,7-trimethyl-1-adamantyl)-1,6-hexanediamine
N-(1-adamantyl)cyclohexylamine
N-(1-adamantyl)cyclooctylamine
N-(1-adamantyl)-α-furfurylamine
N-(3-methyl-1-adamantyl)-β-thienylamine
N-(3,5,7-trimethyl-1-adamantyl)-α-furfurylamine
N-(1-adamantyl)-β-thienylamine
N-β-(2-pyridyl)ethyl-1-adamantylamine
N-(3,5-dimethyl-1-adamantyl)-5-phenylpentylamine
Bis-adamantylamine
Bis(3-methyl-1-adamantyl)amine
Bis(3,5-dimethyl-1-adamantyl)amine
N-(1-adamantyl)dodecylamine
N-(1-adamantyl)-N'-phenylpiperazine
N-(1-adamantyl)piperazine
N-(1-adamantyl)aniline
N-(1-adamantyl)benzylamine
N-(1-adamantyl)phenethylamine
N-(1-adamantyl)homoveratrylamine
Bis(3,5,7-trimethyl-1-adamantyl)amine
N-(3,5,7-trimethyl-1-adamantyl)-1-adamantylamine
1-aminoadamantane
N-(3,5,7-trimethyl-1-adamantyl)-N'-phenylpiperazine The following will illustrate the preparation of certain intermediates and starting materials employed in the present invention.

1-bromo-3,5-dimethyladamantane.—A mixture of 24 g. of 1,3-dimethyladamantane and 80 ml. of bromine was refluxed for 6 hours. The reaction product mixture was cooled, taken up in about 200 ml. of chloroform, and poured onto ice. The excess bromine was removed by adding sodium hydrosulfite. The chloroform layer was separated from the aqueous layer, dried, concentrated in vacuo, and distilled at reduced pressure to yield 30.5 g. of product having a boiling point of about 118° C. at 5–6 mm.; $n_D^{25}$=1.5169–1.5182. The product was identified by nuclear magnetic resonance (NMR) and elemental analyses as 1-bromo-3,5-dimethyladamantane.

1-acetamido-3,5-dimethyladamantane.—A mixture of 20 g. of 1-bromo-3,5-dimethyladamantane, 75 ml. of acetonitrile, and 150 ml. of concentrated sulfuric acid was allowed to react overnight at ambient room temperature. The red reaction product mixture was poured over crushed ice, and the white solid which precipitated was taken up in benzene and the benzene solution dried over sodium hydroxide pellets. The benzene solution was filtered from the drying agent and evaporated to dryness in vacuo to yield 18.2 g. of product having a melting point of about 97° C. and identified by infrared spectrum as 1-acetamido-3,5-dimethyladamantane.

1-amino-3,5-dimethyladamantane.—A mixture of 18 g. of 1-acetamido - 3,5-dimethyladamantane, 38 g. of sodium hydroxide, and 300 ml. of diethylene glycol was refluxed for a period of 6 hours. The reaction product mixture was cooled and poured onto about 2,000 ml. of crushed ice. The basic solution thus obtained was extracted five times with 250-ml. portions of benzene and the aqueous layer was discarded. The combined benzene extracts were dried over sodium hydroxide and the dried benzene solution concentrated in vacuo to give a crude oil weighing 14 g. and having $n_D^{25}=1.4941$. A four-gram sample of the crude oil was dissolved in ether and the solution saturated with anhydrous hydrogen chloride. The solid which precipitated was filtered off and recrystallized from a mixture of alcohol and ether to yield product weighing 3.5 g. and melting at 258° C. It was identified by analysis as 1-amino-3,5-dimethyladamantane hydrochloride.

For a better understanding, the novel compounds and the process of the present invention are illustrated by the following examples, which, however, are not intended to limit the invention in any respect.

Example 1.—N-(1-adamantyl)-n-dodecylamine hydrochloride

A mixture of 21.5 g. (0.01 mole) of 1-bromoadamantane and 50 g. (0.27 mole) of n-dodecylamine was heated to reflux for 8 hours. The reaction product mixture was cooled and the solids which separated were recovered by filtration. These solids were dispersed in 500 ml. of water. The solution thus obtained was made basic and extracted with three 150-ml. portions of ether. The ether extracts were combined, dried over anhydrous potassium hydroxide, and the dried extracts concentrated in vacuo. The solid residue which was obtained was taken up in 50 ml. of hot ethanol. On cooling the alcohol solution, solids precipitated, which were separated by filtration and recrystallized once from ethanol. The crystalline free base was filtered off and dissolved in ether and the ether solution saturated with anhydrous gaseous hydrogen chloride. The hydrochloride addition salt which precipitated from the ether solution was filtered off and recrystallized from hot ethanol to give N-(1-adamantyl)-n-dodecylamine hydrochloride having a melting point of about 210° C.

Example 2.—N-(1-adamantyl)-dl-β-phenylisopropylamine

A mixture of 10.5 g. of 1-bromoadamantane and 27 g. of dl-β-phenylisopropylamine was refluxed overnight. The reaction product mixture, which solidified upon cooling, was dispersed in 200 ml. of water and the mixture was extracted three times with 150 ml. of ether. The combined ether extracts were dried, concentrated in vacuo, and the residual oil distilled at reduced pressure to give material having a boiling point of 121–130° C. at 0.8 mm. Hg. The material was identified by preparing the hydrochloric acid addition salt, N-(1-adamantyl)-dl-β-phenylisopropylamine hydrochloride, having a melting point of about 258° C.

Following the general procedure of Example 2, other compounds were prepared and isolated as free bases or acid addition salts thereof:

N-(1 - adamantyl)homoveratrylamine hydrochloride. Melting point: 244–246° C.

N-(1-adamantyl)benzylamine hydrochloride. Melting point: Sublimes 310° C.

N-(1-adamantyl)-N' - phenylpiperazine hydrochloride. Melting point: 280–282° C.

N-(1-adamantyl)-m-toluidine. Melting point: 57.5–59° C.

N-(1-adamantyl)-2,4-dimethylaniline. Melting point: 140–141° C.

N-(1-adamantyl)-p-toluidine. Melting point: 66–67° C.

N-(1-adamantyl)-p-chloroaniline. Melting point: 142–143° C.

N-(β-hydroxyethyl)-N'-1-adamantylpiperazine dihydrochloride. Melting point: 235–237° C.

N-cyclohexyl - 1-adamantylamine hydrochloride. Melting point: 281–283.5° C.

N-(1 - adamantyl)piperidine hydrochloride. Melting point: 312–314° C.

N-(β-hydroxyethyl) - N'-(3,5,7 - trimethyl - 1-adamantyl)piperazine dihydrochloride. Melting point: 231–233° C.

N-(1 - adamantyl)pyrrolidine hydrochloride. Melting point: 267–269° C. (d.)

Example 3.—N,N-bis(3,5-dimethyladamantyl)amine

A mixture of 7.2 g. of 1-bromo-3,5-dimethyladamantane and 5.4 g. of 1-amino-3,5-dimethyladamantane was heated in a sealed tube at a temperature of about 200° C. overnight. The tube was cooled and the contents taken up in boiling ethanol. The alcohol solution was filtered and an excess of ether was added, thereby precipitating a white solid which had a melting point of about 300° C. and was identified by NMR and analysis as N,N-bis(3,5-dimethyladamantyl)amine hydrobromide. The compound had a $pK'_a$ of 10.10.

The same procedure was used to prepare: N-1-adamantylpiperazine. Boiling point: 180–182° C. Melting point 85–87° C.

Example 4.—1-aminoadamantane

A mixture of 20 g. of 1-bromoadamantane, 50 ml. of ethanol, and 50 ml. of liquid ammonia was heated in a closed stainless-steel bomb at a temperature of about 170° C. for about 15 hours. The reaction vessel was cooled and the reaction product mixture removed and concentrated in vacuo to dryness. The solid residue was treated with 150 ml. of 15 percent aqueous sodium hydroxide solution, and the solution thereby obtained was extracted three times with 50 ml. of ether. The ether extracts were dried over sodium hydroxide, concentrated to about one-half the original volume, and saturated with anhydrous hydrogen chloride. The white solid which precipitated was filtered off and recrystallized from a mixture of ethanol and ether to yield a total of 2.5 g. of product which sublimed at 320° C. and which was identified by infrared spectrum and titration as 1-amino-adamantane hydrochloride. The product had a $pK'_a$ of 10.2.

Example 5.—1-(4-methyl-3-chlorophenyl)-4-(1-adamantyl)piperazine hydrochloride

A mixture of 11 g. of 1-bromoadamantane and 23 g. of 1-(4-methyl-3-chlorophenyl)piperazine was heated in a closed stainless-steel bomb at 185° C. overnight. After cooling, the bomb was opened and the contents poured into water. The insoluble solids which separated were filtered off and recrystallized from a mixture of ethanol and ether to remove unreacted starting materials. The solid was then dissolved in ether and the hydrochloride was precipitated with anhydrous hydrogen chloride and recrystallized from hot alcohol to yield 1-(4-methyl-3-chlorophenyl)-4-(1-adamantyl)piperazine hydrochloride, having a melting point of about 298–300° C.

The same general procedure was employed with appropriate starting materials to prepare: N-(1-adamantyl) ethylamine hydrochloride. Melting point: 328° C.

Example 6.—Bis(1-adamantyl)amine

A mixture of 10.0 g. (0.06 mole) of 1-aminoadamantane and 11.0 g. (0.04 mole) of 1-bromoadamantane was placed in a stainless-steel reaction vessel and the mixture heated overnight at 255° C. The reaction vessel was cooled to room temperature and the solidified reaction product was removed. The crude product was recrystallized from about 200 ml. of absolute ethanol, to yield bis(1-adamantyl)amine hydrobromide, having a melting point of about 334° C.

Example 7.—N-(1-adamantyl)morpholine

A mixture of 5.5 g. of 1-bromoadamantane and 21.75 g. of morpholine was heated in a stainless-steel reaction vessel at 220° C. for about 12 hours. The reaction product mixture was filtered and the filtrate concentrated in vacuo to remove excess solvent. The solid obtained by the filtration and the residue from the concentration were combined and taken up in 500 ml. of ether. The ether solution was extracted with 300 ml. of aqueous 5 percent hydrochloric acid and 300 ml. of water. The combined aqueous extracts were made basic with 50 percent aqueous sodium hydroxide solution and the basic mixture extracted with 500 ml. of ether. The ether extract was washed well with about 500 ml. of water, dried, and concentrated in vacuo. The residue which remained was dissolved in ether, and the ether solution was saturated with anhydrous hydrogen chloride. The solid material which precipitated was separated and recrystallized from ethanol. It had a melting point of 292–294° C. and was identified by analysis as N-(1-adamantyl)morpholine hydrochloride.

The following additional compounds were prepared by way of the procedure of Example 7:

N - (3 - methoxypropyl)-1-adamantylamine hydrochloride. Melting point: 253–254° C.

N - (3 - morpholinopropyl)-1-adamantylamine dihydrochloride. Melting point: 305–307° C. (d.)

N-(1-adamantyl)-1,7-heptanediamine dihydrochloride. Melting point: 283–285° C.

N,N' - bis - (1-adamantyl)-1,4-butanediamine dihydrochloride. Melting point: 283–285° C.

N,N' - bis - (1 - adamantyl)-1,4-butanediamine dihydrochloride. Melting point: 225–227° C.

N,N' - bis - (1-adamantyl)-1,5-pentanediamine dihydrochloride. Melting point: 303° C. (d.)

Example 8.—N-(1-adamantyl)isoquinoline

A mixture of 5 g. of 1-bromoadamantane and 30 g. of isoquinoline was heated at about 220° C. in an oil bath for about 12 hours. The reaction product mixture was concentrated in vacuo to remove unreacted isoquinoline and was then added to a large volume of ether. The solid which precipitated was filtered off, washed with ether, and recrystallized from a mixture of ethanol and ether to yield 5.4 g. of N-(1-adamantyl)isoquinoline bromide, having a melting point of about 272–273° C.

Following essentially the procedure of Example 8, the following compounds were prepared:

N-(1-adamantyl)pyridine bromide. Melting point: 240–242° C. (d.)

N-(1-adamantyl)-4-picoline bromide. Melting point: 223–224° C. (d.)

Example 9.—N-(1-adamantyl)-N-methylaniline

A mixture of 15 g. of 1-bromoadamantane and 50 g. of N-methylaniline was heated in an oil bath overnight at about 120° C. The reaction product mixture was worked up as described in Example 8 to yield N-(1-adamantyl)-N-methylaniline having a melting point of about 109–111° C.

Following this same general procedure, the following compounds were prepared:

N-(2-hydroxyethyl)-1-adamantylamine. Melting point: 78–81° C.

N - (3 - hydroxypropyl) - 1 - adamantylamine. Melting point: 93–95° C.

Example 10.—N-(1-adamantyl)-N,N'-dimethyl-1,3-propanediamine dihydrochloride

A mixture of 9 g. of N-(1-adamantyl)-1,3-propanediamine, 12 ml. of formaldehyde 37 percent solution, and 24 ml. of formic acid was heated to reflux temperature overnight. The reaction product mixture was cooled and the excess solvent removed in vacuo. The residue was dissolved in about 300 ml. of water, made basic with 10 percent aqueous sodium hydroxide solution, and poured into 500 ml. of ether. The ether layer was separated and the aqueous layer discarded. The ether layer was washed with water to a neutral pH, dried, and concentrated to remove volatiles. The residue was dissolved in about 400 ml. of dry ether, and dry hydrogen chloride gas was bubbled into the ether solution until the solution was saturated. The white solid which precipitated was filtered off and recrystallized from a mixture of ethanol and ether to yield N-(1-adamantyl)-N,N'-dimethyl-1,3-propanediamine dihydrochloride having a melting point of about 309° C. (d.).

We claim:

1. A substance of the class consisting of the adamantylamine bases represented by the following formula:

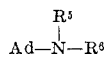

wherein:

Ad is 1 - adamantyl, 3 - methyl-1-adamantyl, 3.5-dimethyl-1-adamantyl, or 3,5,7-trimethyl-1-adamantyl;

$R^5$, when taken alone, is hydrogen;

$R^6$, when taken alone, is Ad, phenyl, or

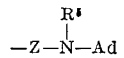

$R^5$ and $R^6$, when taken together with the nitrogen atom to which they are attached, form a heterocyclic ring of the class consisting of piperazine and 4-(substituted)piperazine, the substitutents on said piperazine ring being $C_1$–$C_5$ alkyl, hydroxy-substituted $C_1$–$C_5$ alkyl, phenyl, or substituted phenyl, the substituents on said substituted phenyl being $C_1$–$C_5$ alkyl or halo; and Z is $C_2$–$C_8$ alkylene; and an acid addition salt thereof.

2. A compound as in claim 1, said compound being bis(3,5-dimethyl-1-adamantyl)amine.

3. A compound as in claim 1, said compound being N-(1-adamantyl)-N¹-phenylpiperazine.

4. A compound as in claim 1, said compound being N,N¹-bis(1 - adamantyl) - 1,3-propanediamine dihydrochloride.

5. A compound as in claim 1, said compound being N-(1-adamantyl)aniline.

References Cited

UNITED STATES PATENTS 3,257,456  6/1966  Smith _____ 260—563
3,256,329  6/1966  Kauer _____ 260—563

OTHER REFERENCES

Schleyer et al.: J. Amer. Chem. Soc., vol. 83 (1961), pp. 2700–07.

HENRY R. JILES, *Primary Examiner.*

R. BOYD, *Assistant Examiner.*